(12) United States Patent
Viswanath et al.

(10) Patent No.: US 9,959,406 B2
(45) Date of Patent: May 1, 2018

(54) SYSTEM AND METHOD FOR ZERO-DAY PRIVILEGE ESCALATION MALWARE DETECTION

(71) Applicant: INSTITUTE FOR DEVELOPMENT AND RESEARCH IN BANKING TECHNOLOGY, Hyderabad (IN)

(72) Inventors: Hiran Viswanath, Hyderabad (IN); Babu Mahadappa Mehtre, Hyderabad (IN)

(73) Assignee: INSTITUTE FOR DEVELOPMENT AND RESEARCH IN BANKING TECHNOLOGY, Hyderabad (IN)

( * ) Notice: Subject to any disclaimer, the term of this patent is extended or adjusted under 35 U.S.C. 154(b) by 153 days.

(21) Appl. No.: 15/093,690

(22) Filed: Apr. 7, 2016

(65) Prior Publication Data
US 2017/0161495 A1   Jun. 8, 2017

(30) Foreign Application Priority Data
Dec. 2, 2015   (IN) .......................... 6477/CHE/2015

(51) Int. Cl.
*H04L 29/06*  (2006.01)
*G06F 21/55*  (2013.01)
*G06F 21/56*  (2013.01)

(52) U.S. Cl.
CPC .......... *G06F 21/554* (2013.01); *G06F 21/566* (2013.01)

(58) Field of Classification Search
CPC ............................ G06F 21/554; G06F 21/566
USPC .......................................................... 726/23
See application file for complete search history.

(56) References Cited

U.S. PATENT DOCUMENTS

| | | | | |
|---|---|---|---|---|
| 9,152,789 | B2 * | 10/2015 | Natarajan | H04L 63/1416 |
| 2005/0021668 | A1 * | 1/2005 | Beesley | H04L 63/1416 709/217 |
| 2008/0016564 | A1 * | 1/2008 | Claudatos | G06F 21/554 726/22 |

* cited by examiner

*Primary Examiner* — Michael S McNally
(74) *Attorney, Agent, or Firm* — Barry Choobin; Patent 360 LLC

(57) ABSTRACT

The various embodiments herein disclose a system and method for detecting zero-day privilege escalation malware at host level. The method identifies whether a privileged escalation state is initiated and executed by a user or by a malware program. The method uses keystrokes, Mouse events along with OCR output extracted from recorded background screen image for checking if user has initiated the privilege escalation. If a new process starts automatically without any pattern in Key Strokes, Mouse Strokes and background screen, then the process is identified as zero-day privilege escalation malware.

10 Claims, 3 Drawing Sheets

SYSTEM AND METHOD FOR ZERO-DAY PRIVILEGE ESCALATION MALWARE DETECTION

CROSS REFERENCE TO RELATED APPLICATIONS

Benefit is claimed under 35 U.S.C. 119(a)-(d) to Foreign application Serial No. 6477/CHE/2015 filed in India entitled "A SYSTEM AND METHOD FOR DETECTING ZERO-DAY PRIVILEGE ESCALATION MALWARE", on Dec. 2, 2015, which is herein incorporated in its entirety by reference for all purposes.

TECHNICAL FIELD

The embodiments herein is generally related to software security systems and methods. The embodiments herein is particularly related to a malware detection system and method. The embodiments herein more particularly relate to a system and method for detecting zero-day privilege escalation malware.

DESCRIPTION OF THE RELATED ART

Malicious software or malware includes any program or file that is harmful to a computer. Malware includes computer viruses, worms, Trojan horses, adware, spyware, and any program that gathers information about a computer or its user or otherwise operates without permission. Another threat that can harm the computer software are zero day attacks. A Zero-Day attack is an exploit for an unpatched vulnerability where even the most up-to-date system is infected. A vulnerability is a bug in an application (or operating system) that might be used by someone to execute an unauthorized code on a machine. A piece of code triggers the vulnerability and executes a malicious action inside the vulnerable application on a machine.

The zero day threat landscape evolves at a rapid pace and cyber criminals do not simply reuse old codes and vulnerabilities but find new ones of their own. However, there is a lack of awareness on zero-day threats and most businesses or consumers are not properly equipped to deal with them. Most of the current solutions at the gateway or end-point is based on signatures. This approach is ineffective against brand new exploits and malwares.

The existing zero-day malware detection method uses heterogeneous Virtual Machine (VM). In this method, malware is executed in the VM. Currently, the advanced Malwares bypasses the virtual machine. Thus present day malware detectors are not effective in tracking the malwares. The currently available zero-day malware detection systems do not analyze all sub routines in a program. The classification of malware is done based on a single execution cycle in which not all sub routines are evaluated.

Another prior art discloses a method of using Application Program Interface (API) call signatures for detecting zero day malwares. The method is developed based on the supervised learning algorithms for detecting zero-day malware. The method assumes a signature of the zero-day malware (sample API Call) is known and available for supervised learning. The method is able to detect only variants of the known Malwares. However, the prior art does not disclose a method to detect an exploit developed from zero-day vulnerability. There is no method for detecting zero-day privilege escalation malware in real time/in live system.

Hence, there is a need for a system and method for detecting any malware including a zero day threat that exploits an operating system privilege escalation vulnerability. Further, there is a need for a method to identify whether a privileged escalation state is initiated and executed by a user or by a malware program. Further, there is a need for a method to validate a user initiated privilege escalation in a host level without profiling a user behavior.

The above-mentioned shortcomings, disadvantages and problems are addressed herein, which will be understood by reading and studying the following specification.

Objects of the Embodiments

The primary object of the embodiments herein is to provide a system and method for detecting a zero-day privilege escalation malware at a host level.

Another object of the embodiments herein is to provide a system and method to identify whether a privileged escalation state is initiated and executed by a user or by a malware program.

Yet another object of the embodiments herein is to provide a system and a method for checking whether the user has initiated the privilege escalation by using the keystrokes, the Mouse events (movements and clicks) along with an OCR output extracted from a recorded background screen image.

Yet another object of the embodiments herein is to provide a system and method of detecting any malware including Ransomware and Crypto locker to exploit privilege escalation to encrypt an entire hard drive.

Yet another object of the embodiments herein is to provide a system and method for extracting a plurality of words using OCR from a background screen image for determining the process names and a privilege of execution.

Yet another object of the embodiments herein is to provide a system and method for detecting a zero day malware that operates on various Graphical User Interface based operating systems.

These and other objects and advantages of the embodiments herein will become readily apparent from the following detailed description taken in conjunction with the accompanying drawings.

SUMMARY

The various embodiments herein disclose a method and system for detecting a zero-day privilege escalation malware at a host level. The method involves identifying whether a privileged escalation state is initiated and executed by a user or by a malware program. The embodiments herein discloses a method of using the keystrokes, the Mouse events (movements and clicks) along with an optical character recognition (OCR) output extracted from a recorded background screen image for checking whether the user has initiated the privilege escalation.

According to an embodiment herein, a computer-implemented method is provided for detecting zero-day privilege escalation malware in a computing environment. The method comprises computer-readable instructions stored on a non-transitory computer readable medium and executed on a computing device comprising hardware processor and a memory, for detecting zero-day privilege escalation malware in a computing environment. The method comprises monitoring a plurality of key strokes and a plurality of mouse events performed on the computing device. The plurality of keystrokes is detected by a key logger and the plurality of mouse events are detected by a mouse event logger. The plurality of mouse events comprises a plurality of mouse movements and a plurality of mouse clicks. A display screen of the computing device is recorded with a screen recorder, on an occurrence of each mouse click. A correlation between the plurality of key strokes and the plurality of mouse movements is determined to extract a first list of words using a first correlation engine. The first list of words is typed using a keyboard. A newly initiated privileged process in the computing environment is detected using a process analysis module. A correlation between the plurality of mouse clicks and the recorded display screen is determined using the second correlation engine to extract a second list of words. The second correlation engine checks whether the newly initiated privilege process is initiated by a user based on the second list of words. A newly initiated process is identified as a zero day privilege escalation malware using the process analysis module when the newly initiated privilege process is not specified in a list of processes that correspond to the first list of words. Further, a newly initiated process is identified as a zero day privilege escalation malware using the process analysis module when the newly initiated privilege process is not specified in a list of processes corresponding to the second list of words. A plurality of newly initiated process that matches with the list of processes corresponding to at least one of the first list of words and the second list of words is checked for the presence of user control commands using the process analysis module. The presence of user control commands identifies the newly initiated process as a user initiated process. At least one of a newly initiated process is identified from the plurality of newly initiated process as a zero day privilege escalation malware using the process analysis module when the user control commands are absent.

According to an embodiment herein, a process analysis module configured to detect whether a zero-day privilege escalation is also extended to detect SPAM mails. The text extracted from background screen is correlated with the URLs visited from the system or the browser.

According to an embodiment herein, a computer system for detecting zero-day privilege escalation malware in a computing environment is provided. The system comprises a hardware processor coupled to a memory containing instructions configured for running a privilege escalation module for identifying a malware. The system comprises a key logger configured to detect keystrokes performed by a user. A mouse event logger is configured to detect a plurality of mouse events. The plurality of mouse events comprises a plurality of mouse movements and a plurality of mouse clicks. A screen recorder is configured to record a display screen of the computing device on occurrence of each mouse click. An OCR word extractor is configured to extract at least one of a first list of words and a second list of words. A first correlation engine is configured to determine a correlation between the key strokes and the mouse movements to extract a first list of words, wherein the first list of words are typed using keyboard. A second correlation engine is configured to determine a correlation between the plurality of mouse clicks and recorded screen to extract a second list of words.

Further, the system comprises a process analysis module configured to detect a newly initiated privileged process in the computing environment. The process analysis module is further configured to identify the newly initiated process as a zero day privilege escalation malware when the newly initiated privilege process is not specified in a list of processes corresponding to the first list of words. The process analysis module is further configured to identify the newly initiated process as a zero day privilege escalation malware when the newly initiated privilege process is not specified in a list of processes corresponding to the second list of words. The process analysis module is further configured to check a plurality of newly initiated process that are specified in the list of processes corresponding to at least one of the first list of words and the second list of words, the presence of user control commands. The presence of user control commands helps to identify the newly initiated process as a user initiated process. The process analysis module is further configured to identify at least one of a newly initiated process from the plurality of newly initiated process as a zero day privilege escalation malware, when the user control commands are absent.

According to an embodiment herein, the privilege escalation detection module is configured to terminate and remove the newly detected zero-day privilege escalating process from the system. Further, a report is generated and the executables are uploaded to various antivirus databases. Furthermore, the system updates the hash value to total virus website and other host and network security products. The system is configured to correlate the text extracted from background screen and the URLs visited from the system or the browser.

According to an embodiment herein, the system comprises graphical user interface (GUI) based operating systems such as Windows, LINUX, Solaris, and Mac OS.

According to an embodiment herein, the system includes an inbuilt camera for checking the presence of a user in the system. Thus, the system helps to detect remote login or network attacks.

Further, the embodiments herein discloses a method and system for detecting all types of malware including Ransomware and Crypto locker that exploit privilege escalation to encrypt entire hard drive.

According to an embodiment herein, a non-transitory computer readable medium is stored with computer-readable instructions that are executed on a computing device comprising a hardware processor and a memory to perform a method for detecting zero privilege escalation in a computing environment. The method comprises monitoring a plurality of key strokes and a plurality of mouse events performed on the computing device. The plurality of keystrokes is detected by a key logger, and the plurality of mouse events are detected by a mouse event logger. The plurality of mouse events comprises a plurality of mouse movements and a plurality of mouse clicks. A display screen of the computing device is recorded with a screen recorder on occurrence of each mouse event. A correlation between the plurality of key strokes and the plurality of mouse movements is determined using a first correlation engine to extract a first list of words, and the first list of words are typed using a keyboard. A newly initiated privileged process in the computing environment is detected using a process analysis module. A correlation between the plurality of mouse clicks and the recorded display screen is determined with the second correlation engine to extract a second list of words. The method further comprises checking whether the new privilege process is initiated by a user based on the second list of words.

Further, a newly initiated process is identified as a zero-day privilege escalation malware using the process analysis module, when the newly initiated privilege process is not specified in a list of processes corresponding to the first list of words. A newly initiated process is identified as a zero day privilege escalation malware using the process analysis module, when the newly initiated privilege process is not specified in a list of processes corresponding to the second list of words. A plurality of newly initiated process that matches with the list of processes corresponding to at least one of the first list of words and the second list of words is checked with the process analysis module to identify a presence of user control commands. The presence of user control commands is identified to confirm that the newly initiated process is a user-initiated process. At least one of a newly initiated process is identified from the plurality of newly initiated process as a zero day privilege escalation malware using the process analysis module when the user control commands are absent.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1:
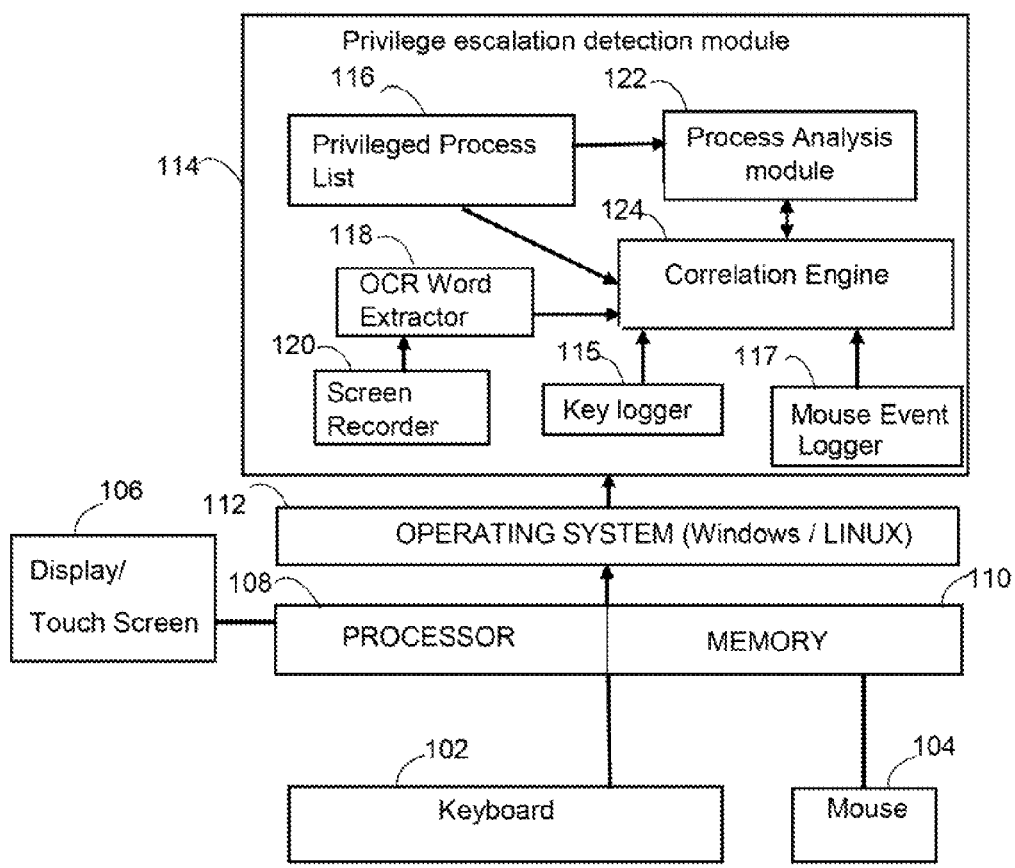
FIG. 1 illustrates a block diagram of a system for detecting a zero day privilege escalation malware in a computing environment, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein disclose a method and system for detecting a zero-day privilege escalation malware at a host level. The method involves identifying whether a privileged escalation state is initiated and executed by a user or by a malware program. The embodiments herein discloses a method of using the keystrokes, the Mouse events (movements and clicks) along with an optical character recognition (OCR) output extracted from a recorded background screen image for checking whether the user has initiated the privilege escalation.

According to an embodiment herein, a computer-implemented method is provided for detecting zero-day privilege escalation malware in a computing environment. The method comprises computer-readable instructions stored on a non-transitory computer readable medium and executed on a computing device comprising hardware processor and a memory, for detecting zero-day privilege escalation malware in a computing environment. The method comprises monitoring a plurality of key strokes and a plurality of mouse events performed on the computing device. The plurality of keystrokes is detected by a key logger and the plurality of mouse events are detected by a mouse event logger. The plurality of mouse events comprises a plurality of mouse movements and a plurality of mouse clicks. A display screen of the computing device is recorded with a screen recorder, on an occurrence of each mouse event. A correlation between the plurality of key strokes and the plurality of mouse movements is determined to extract a first list of words using a first correlation engine. The first list of words is typed using a keyboard. A newly initiated privileged process in the computing environment is detected using a process analysis module. A correlation between the plurality of mouse clicks and the recorded display screen is determined using the second correlation engine to extract a second list of words. The second correlation engine checks whether the newly initiated privilege process is initiated by a user based on the second list of words. A newly initiated process is identified as a zero day privilege escalation malware using the process analysis module when the newly initiated privilege process is not specified in a list of processes that correspond to the first list of words. Further, a newly initiated process is identified as a zero day privilege escalation malware using the process analysis module when the newly initiated privilege process is not specified in a list of processes corresponding to the second list of words. A plurality of newly initiated process that matches with the list of processes corresponding to at least one of the first list of words and the second list of words is checked for the presence of user control commands using the process analysis module. The presence of user control commands identifies the newly initiated process as a user initiated process. At least one of a newly initiated process is identified from the plurality of newly initiated process as a zero day privilege escalation malware using the process analysis module when the user control commands are absent.

According to an embodiment herein, a process analysis module configured to detect whether a zero-day privilege escalation is also extended to detect SPAM mails. The text extracted from background screen is correlated with the URLs visited from the system or the browser.

According to an embodiment herein, a computer system for detecting zero-day privilege escalation malware in a computing environment is provided. The system comprises a hardware processor coupled to a memory containing instructions configured for running a privilege escalation module for identifying a malware. The system comprises a key logger configured to detect keystrokes performed by a user. A mouse event logger is configured to detect a plurality of mouse events. The plurality of mouse events comprises a plurality of mouse movements and a plurality of mouse clicks. A screen recorder is configured to record a display screen of the computing device on occurrence of each mouse event. An OCR word extractor is configured to extract at least one of a first list of words and a second list of words. A first correlation engine is configured to determine a correlation between the key strokes and the mouse movements to extract a first list of words, and the first list of words are typed using keyboard. A second correlation engine is configured to determine a correlation between the plurality of mouse clicks and recorded screen to extract a second list of words.

Further, the system comprises a process analysis module configured to detect a newly initiated privileged process in the computing environment. The process analysis module is further configured to identify the newly initiated process as a zero day privilege escalation malware when the newly initiated privilege process is not specified in a list of processes corresponding to the first list of words. The process analysis module is further configured to identify the newly initiated process as a zero day privilege escalation malware when the newly initiated privilege process is not specified in a list of processes corresponding to the second list of words. The process analysis module is further configured to check a plurality of newly initiated process that are specified in the list of processes corresponding to at least one of the first list of words and the second list of words, the presence of user control commands. The presence of user control commands helps to identify the newly initiated process as a user initiated process. The process analysis module is further configured to identify at least one of a newly initiated process from the plurality of newly initiated process as a zero day privilege escalation malware, when the user control commands are absent.

According to an embodiment herein, the privilege escalation detection module is configured to terminate and remove the newly detected zero-day privilege escalating process from the system. Further, a report is generated and the executables are uploaded to various antivirus databases. Furthermore, the system updates the hash value to virus total website and other host and network security products. The system is configured to correlate the text extracted from background screen and the URLs visited from the system or the browser.

According to an embodiment herein, the system comprises graphical user interface (GUI) based operating systems such as Windows, LINUX, Solaris, and Mac OS.

According to an embodiment herein, the system includes an inbuilt camera for checking the presence of a user in the system. Thus, the system helps to detect remote login or network attacks.

Further, embodiments herein discloses a method and system for detecting all types of malware including Ransomware and Crypto locker that exploit privilege escalation to encrypt entire hard drive.

According to an embodiment herein, a non-transitory computer readable medium is stored with computer-readable instructions that are executed on a computing device comprising a hardware processor and a memory to perform a method for detecting zero privilege escalation in a computing environment. The method comprises monitoring a plurality of key strokes and a plurality of mouse events performed on the computing device. The plurality of keystrokes is detected by a key logger, and the plurality of mouse events are detected by a mouse event logger. The plurality of mouse events comprises a plurality of mouse movements and a plurality of mouse clicks. A display screen of the computing device is recorded with a screen recorder on occurrence of each mouse event. A correlation between the plurality of key strokes and the plurality of mouse movements is determined using a first correlation engine to extract a first list of words, and the first list of words are typed using a keyboard. A newly initiated privileged process in the computing environment is detected using a process analysis module. A correlation between the plurality of mouse clicks and the recorded display screen is determined with the second correlation engine to extract a second list of words. The method further comprises checking whether the new privilege process is initiated by a user based on the second list of words.

Further, a newly initiated process is identified as a zero-day privilege escalation malware using the process analysis module, when the newly initiated privilege process is not specified in a list of processes corresponding to the first list of words. A newly initiated process is identified as a zero day privilege escalation malware using the process analysis module, when the newly initiated privilege process is not specified in a list of processes corresponding to the second list of words. A plurality of newly initiated process that matches with the list of processes corresponding to at least one of the first list of words and the second list of words is checked with the process analysis module to identify a presence of user control commands. The presence of user control commands is identified to confirm that the newly initiated process is a user-initiated process. At least one of a newly initiated process is identified from the plurality of newly initiated process as a zero day privilege escalation malware using the process analysis module when the user control commands are absent.

FIG. 1 illustrates a block diagram of a system for zero day privilege escalation malware detection, according to an embodiment herein. The system includes keyboard 102, mouse 104, display 106, processor 108, memory 110 and privilege escalation detection module 114 on a computing device. The computing device is any one of server device, client device, and personal computing device. According to an embodiment herein, the display 106 is a touchscreen display device. The privilege escalation detection module 114 is configured to run an application on the computing device to identify one of a normal Privilege escalation and a zero day privilege escalation. A user initiates the normal Privilege escalation process. The user activity is identified by analyzing a Pattern found in the Key Strokes, Mouse Strokes and Extracted Text out of background screen using OCR. When a new process is started automatically without any pattern in Key Strokes, Mouse Strokes and background screen, then the process is identified as a zero-day privilege escalation. The system operates on a graphical user interface (GUI) based operating system 112 such as Windows, LINUX, Solaris, and Mac OS.

According to an embodiments herein, a hardware processor 108 is coupled to a memory 110 containing instructions configured for running the privilege escalation module 114 to detect a malware. The input device of the computing device is selected from a group consisting of the keyboard 102, the mouse 104 and the display or touch screen 106. According to an embodiment herein, the display unit is a monitor. The Zero-day Privilege escalation malware detection application is configured to run on top of the operating system 112. The privilege escalation detection module 114 further includes a key logger 115, a mouse event logger 117, a screen recorder 120, an OCR word extractor 118, a correlation engine 124 and a process analysis module 122. The Key logger 115 is configured to record the user activity by analyzing key strokes during typing. The Mouse Event logger 117 is configured to record the mouse clicks and mouse movements along with the X and Y screen co-ordinates. The screen recorder 120 is configured to record a display screen image upon each mouse click. The OCR Word extractor 118 is configured to extract the words from the recorded background screen image by scanning the image and recognizing the written text. Further, the list of newly started processes that are executed in the privileged mode are collected in a privileged process list 116. The Correlation Engine 124 further includes a first correlation engine and a second correlation engine. The first correlation engine is configured to determine correlation between key strokes and mouse movements to extract a first list of words. The second correlation engine configured to determine correlation between mouse clicks and recorded screen to extract a second list of words.

Further, the system includes a process analysis module 122 configured to detect newly initiated privileged processes in the computing environment. The process analysis module 122 is further configured to identify the newly initiated process as a zero day privilege escalation malware when the newly initiated privilege process is not specified in a list of processes corresponding to the first list of words. The process analysis module 122 is further configured to identify the newly initiated process as a zero day privilege escalation malware when the newly initiated privilege process is absent in a list of processes corresponding to the second list of words. The process analysis module 122 is further configured to check the presence of user control commands in a plurality of newly initiated process that are specified in the list of processes corresponding to at least one of the first list of words and the second list of words. The presence of user control commands identifies and confirms that the newly initiated process is a user-initiated process. The process analysis module 122 is further configured to identify at least one of a newly initiated process from the plurality of newly initiated process as a zero day privilege escalation malware when the user control commands are absent.

According to an embodiment herein, the privilege escalation detection module is configured to terminate and remove the newly detected zero-day privilege escalating process from the system. Further, a report is generated and the executables are uploaded to various antivirus databases. Furthermore, the system updates the hash value to total virus website and other host and network security products. The system is configured to correlate the text extracted from background screen and the URLs visited from the system or the browser.

According to an embodiment herein, the system for detecting zero-day privilege escalation has inbuilt cameras for checking the presence of user in the system. Thereby, the system helps to detect a remote login or network attacks.

According to an embodiment herein, the system for detecting zero-day privilege escalation includes monitoring and correlating system call or API Calls along with keystrokes, mouse events and OCR output from recorded screen shots images for making it robust.

According to an embodiment herein, the system for detecting zero-day privilege escalation is also configured to detect SPAM mails. The system is configured to correlate the text extracted from background screen and the URLs visited from the system or the browser.

Figure 2:
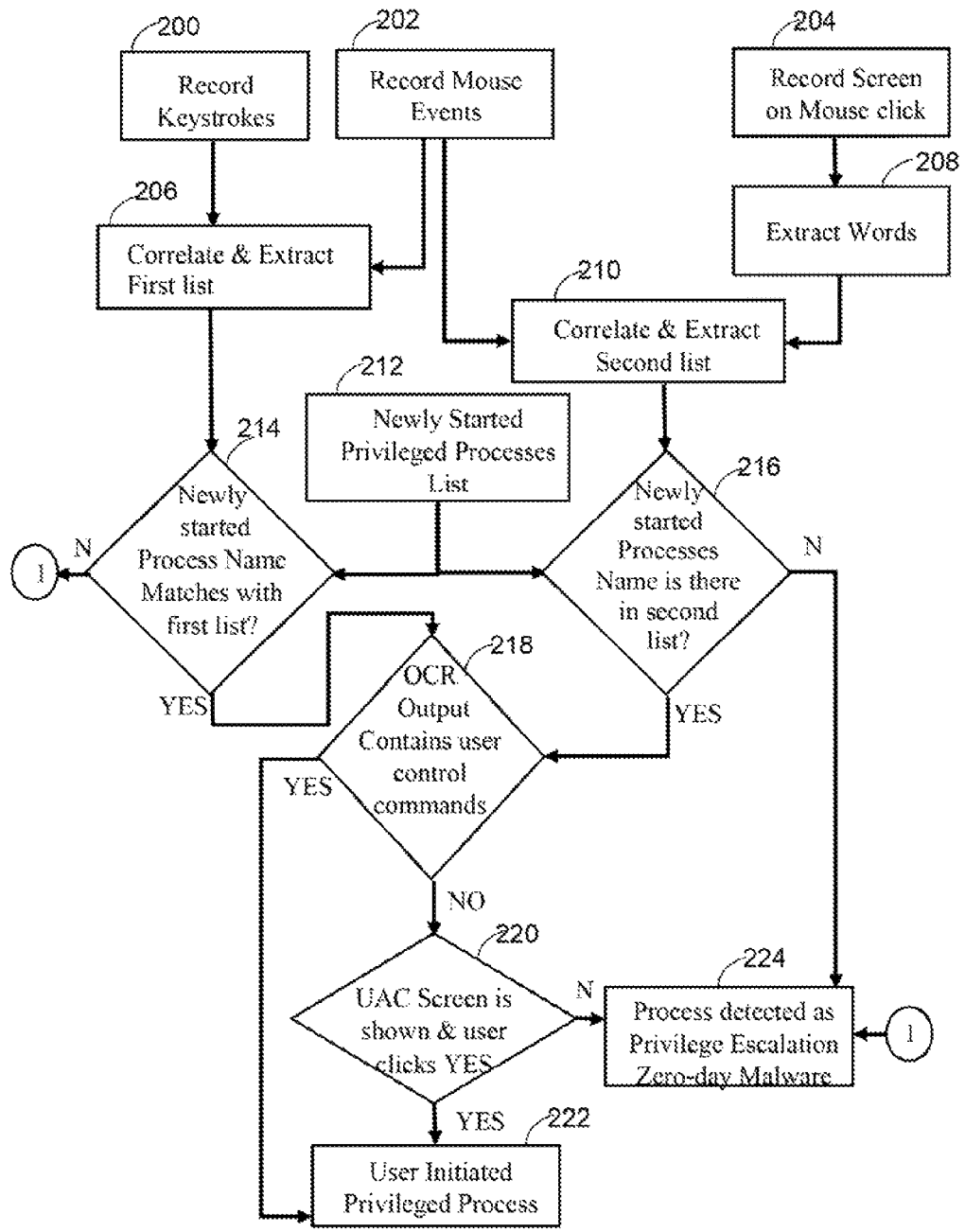
FIG. 2 illustrates a flowchart explaining a method for detecting a zero-day privilege escalation malware in a computing environment, according to an embodiment herein.

FIG. 2 illustrates a flowchart explaining a method of zero-day privilege escalation detection, according to an embodiment herein. The embodiments herein discloses a computer implemented method comprising computer-readable instructions stored on a non-transitory computer readable medium and executed on a computing device comprising hardware processor and a memory, for detecting zero-day privilege escalation malware in a computing environment. The embodiments herein provides a privilege escalation detection module configured to run an application on the computing device to identify one of a normal Privilege escalation process and a zero day privilege escalation processes.

The method includes monitoring a plurality of key strokes and a plurality of mouse events performed on the computing device. At step 200, a key logger detects the plurality of keystrokes. At step 202, a mouse event logger detects the plurality of mouse events. The plurality of mouse events comprises a plurality of mouse movements and a plurality of mouse clicks along the X and Y screen co-ordinates. At step 204, a display screen of the computing device is recorded on occurrence of each mouse event with a screen recorder. At step 206, a correlation between the plurality of key strokes and the plurality of mouse movements is determined to extract a first list of words using a first correlation engine, and wherein the first list of words are typed using a keyboard. At step 208, the words are extracted from recorded OCR screens by an OCR screen recorder. At step 210, a correlation between the plurality of mouse clicks and the recorded display screen is determined with the second correlation engine to extract a second list of words. At step 212, a newly initiated privileged process in the computing environment is detected by a process analysis module. At step 214, the process analysis module checks whether the newly initiated privilege process is present in a list of processes that correspond to the first list of words. If 'yes' then step 218 is performed, else step 224 is performed. At step 216, the process analysis module checks whether the newly initiated privilege process is present in a list of processes corresponding to the second list of words. If 'yes' then step 218 is performed, else step 224 is performed. At step 218, the process analysis module checks for the presence of user control commands in a plurality of newly initiated process that corresponds to the processes in the first list or the second list. The user control commands include 'user account control' and 'run as administrator'. When the user control commands are present in each of the newly initiated process, then step 222 is performed, else step 220 is performed. At step 220, the user account control screen is checked to determine whether the user has selected 'Yes' for the request or command 'run as administrator'. When the user selected 'Yes' then step 222 is performed, else step 224 is performed. At step 222, the presence of user control commands identifies and confirms that the newly initiated process is a user-initiated process for execution in privilege mode. In another condition, the newly initiated process is identified as a user initiated process when the selection of 'Yes' coordinates are identified in the User Account control screen. At step 224, the process analysis module identifies a newly initiated process as a zero day privilege escalation malware using the process analysis module when the newly initiated privilege process is absent in a list of processes corresponding to the first list of words. Further, a newly initiated process is identified as a zero day privilege escalation malware using the process analysis module when the newly initiated privilege process is not specified in a list of processes corresponding to the second list of words. In another condition, at step 224, at least one of a newly initiated process from the plurality of newly initiated process is detected as a zero day privilege escalation malware using the process analysis module when the user control commands are absent.

According to an embodiment herein, the method further includes detecting whether a zero-day privilege escalation is also extended to detect SPAM mails. The method includes correlating the text extracted from background screen and the URLs visited from the system or the browser.

Figure 3:
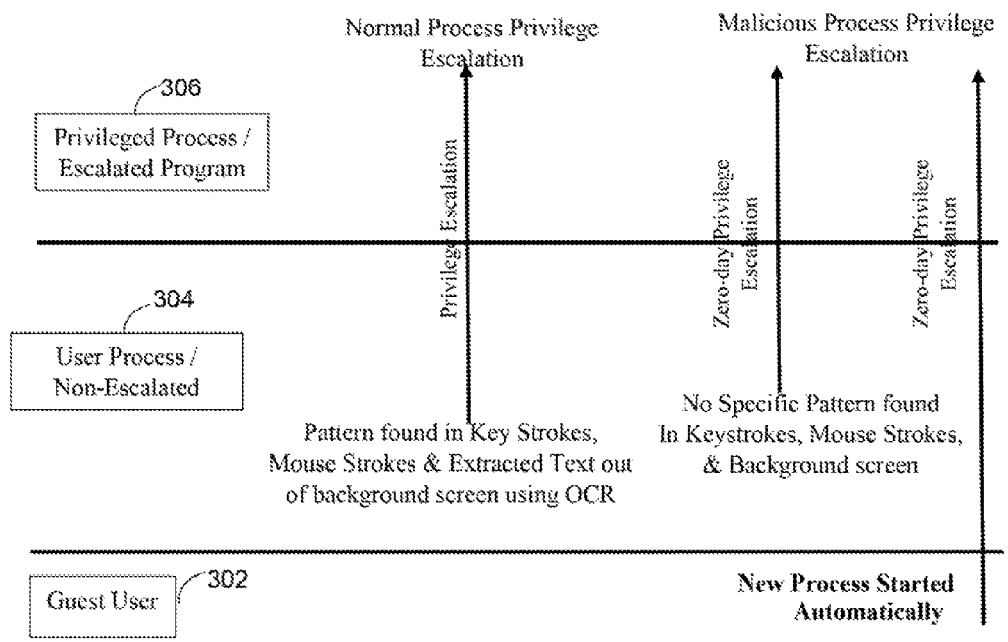
FIG. 3 illustrates a flowchart indicating the process sequences executed in the method of zero day privilege escalation detection, according to an embodiment herein.

FIG. 3 illustrates a sequence chart indicating a process sequences executed in the method of zero day privilege escalation detection, according to an embodiments herein. The method involves identifying whether a privileged escalation state is initiated and executed by a user or by a malware program. The method involves detecting and analyzing the keystrokes, Mouse events (movements and clicks) along with OCR output extracted from recorded background screen image for checking whether one of the guest user 302 and a user 304 has initiated the privilege escalation. The method further includes extracting words using OCR from background screen image for understanding process names and privilege of execution.

According to an embodiment herein, the new process is labelled as a zero day privilege escalation malware when the process name is not included in the word list. On identifying a malicious process privilege escalation, a privilege escalation detection module is designed to inform the system administrator that a zero-day privilege escalation malware program is detected. Further, the privilege escalation detection module is designed to stop and remove the newly detected zero-day privilege escalating process from the system. Further, a report is generated and the executables are uploaded to various antivirus databases. Furthermore, the system updates the hash value to virus-total website and other host and network security products.

Further, embodiments herein discloses a method of detecting all types of malware including Ransomware and Crypto locker that exploit privilege escalation to encrypt entire hard drive. The method operates on Graphical User Interface based operating systems including but not limited to windows, LINUX, Solaris, and Mac operating system.

The embodiments herein provides a system for detecting zero-day privilege escalation malware at host level. The method identifies whether a privileged escalation state is initiated and executed by a user or by a malware program. Further, the embodiments herein works in live system in real time environment. The embodiments herein neither uses any virtual Machine for analyzing files nor for Network traffic analysis. The embodiments herein determine whether the privilege escalation is done by the user or by an automated program. The embodiments herein can detect remote login or network attacks by including a security camera. Further, the embodiments herein detects all types of privilege escalation malwares and zero-day privilege escalation malwares. The method of the embodiments herein detects Ransomware & Cryptolocker, that exploit privilege escalation to encrypt entire hard drive.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the an will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A computer implemented method comprising computer-readable instructions stored on a non-transitory computer readable medium and executed on a computing device comprising hardware processor and a memory, for detecting zero-day privilege escalation malware in a computing environment, the method comprises:

monitoring a plurality of key strokes and a plurality of mouse events performed on the computing device, and wherein the plurality of keystrokes is detected by a key logger, and wherein the plurality of mouse events are detected by a mouse event logger, and wherein the plurality of mouse events comprises a plurality of mouse movements and a plurality of mouse clicks;

recording a display screen of the computing device on occurrence of each mouse click with a screen recorder;

determining a correlation between the plurality of key strokes and the plurality of mouse movements to extract a first list of words using a first correlation engine, wherein the first list of words are typed using a keyboard;

detecting newly initiated privileged processes in the computing environment using a process analysis module;

identifying a newly initiated process as a zero day privilege escalation malware using the process analysis module when the newly initiated privilege process is not specified in a list of processes corresponding to the first list of words;

determining a correlation between the plurality of mouse clicks and the recorded display screen using a second correlation engine to extract a second list of words;

identifying a newly initiated process as a zero day privilege escalation malware using the process analysis module when the newly initiated privilege process is not specified in a list of processes corresponding to the second list of words;

checking a presence of user control commands using the process analysis module in the plurality of newly initiated process that matches with the list of processes corresponding to at least one of the first list of words and the second list of words, and wherein the presence of user control commands is identified to confirm that the newly initiated process is a user initiated process; and identifying at least one of a newly initiated process from the plurality of newly initiated process as a zero day privilege escalation malware using the process analysis module when the user control commands are absent.

2. The medium as claimed in claim 1, wherein the list of stored user control commands comprises at least one of "run as Administrator", and "user account control".

3. The method as claimed in claim 1 further comprises detecting malware comprising Ransomware and Crypto locker.

4. The method as claimed in claim 1, wherein the method is operated with Graphical User Interface based operating systems and wherein the graphical user based operating systems comprises windows, LINUX, Solaris, and Mac operating systems.

5. The method as claimed in claim 1, further detects spam emails to correlate the text extracted from background screen and the URLs visited from the system.

6. A computer system for detecting zero-day privilege escalation malware in a computing environments, the system comprising:
- a hardware processor coupled to a memory containing instructions configured for running a privilege escalation module to detect malware;
- a key logger configured to detect keystrokes performed by a user;
- a mouse event logger configured to detect mouse events, wherein the plurality of mouse events comprises a plurality of mouse movements and a plurality of mouse clicks;
- a screen recorder configured to record a display screen of the computing device on occurrence of each mouse click;
- an OCR word extractor configured to extract at least one of a first list of words and a second list of words;
- a first correlation engine configured to determine a correlation between the plurality of key strokes and the plurality of mouse movements to extract a first list of words;
- a second correlation engine configured to determine a correlation between the plurality of mouse clicks and the recorded screen to extract a second list of words; and
- a process analysis module;
- wherein the process analysis module is configured to detect a newly initiated privileged processes in the computing environment, and wherein the process analysis module is configured to identify the newly initiated process as a zero day privilege escalation malware when the newly initiated privilege process is not specified in a list of processes corresponding to the first list of words, and wherein the process analysis module is configured to identify the newly initiated process as a zero day privilege escalation malware when the newly initiated privilege process is not specified in a list of processes corresponding to the second list of words, and wherein the process analysis module is configured to detect a presence of user control commands in the plurality of newly initiated process that are specified in the list of processes corresponding to at least one of the first list of words and the second list of words, and wherein the process analysis module identifies the presence of user control commands to judge that the newly initiated process is a user initiated process, and wherein the user control commands comprises at least one of "run as Administrator", and "user account control"; and wherein the process analysis module is configured to identify at least one of a newly initiated process from the plurality of newly initiated process as a zero day privilege escalation malware when the user control commands are absent.

7. The system as claimed in claim 6, wherein the process analysis module is further configured to terminate and remove a process that is identified as a zero day privilege escalation.

8. The system as claimed in claim 6 further comprises an inbuilt camera for determining presence of a user in the system.

9. The system as claimed in claim 6, further comprises graphical user interface (GUI) based operating systems, and wherein the GUI based operating systems includes windows, LINUX, Solaris, and Mac OS.

10. A non-transitory computer readable medium stored with computer-readable instructions that are executed on a computing device comprising a hardware processor and a memory to perform a method for detecting zero privilege escalation in a computing environment, the method comprising steps of:
- monitoring a plurality of key strokes and a plurality of mouse events performed on the computing device, and wherein the plurality of keystrokes is detected by a key logger, and wherein the plurality of mouse events are detected by a mouse event logger, and wherein the plurality of mouse events comprises a plurality of mouse movements and a plurality of mouse clicks;
- recording a display screen of the computing device on occurrence of each mouse event with a screen recorder;
- determining a correlation between the plurality of key strokes and the plurality of mouse movements to extract a first list of words using a first correlation engine, wherein the first list of words are typed using a keyboard;
- detecting a newly initiated privileged processes in the computing environment using a process analysis module;
- identifying the newly initiated process as a zero day privilege escalation malware using the process analysis module when the newly initiated privilege process is not specified in a list of processes corresponding to the first list of words;
- determining a correlation between the plurality of mouse clicks and the recorded display screen using a second correlation engine to extract a second list of words;
- identifying the newly initiated process as a zero day privilege escalation malware using the process analysis module when the newly initiated privilege process is not specified in a list of processes corresponding to the second list of words;
- checking for a presence of user control commands using the process analysis module in a plurality of newly initiated process that are specified in the list of processes corresponding to at least one of the first list of words and the second list of words, and wherein the presence of user control commands is identified to judge that the newly initiated process is a user initiated process, and wherein the user control commands comprises at least one of "run as Administrator", and "user account control"; and
- identifying at least one of a newly initiated process from the plurality of newly initiated process as a zero day privilege escalation malware using the process analysis module when the user control commands are absent.

\* \* \* \* \*